No. 657,611. Patented Sept. 11, 1900.
B. & J. M. NORTHCUTT.
CHURN.
(Application filed Nov. 15, 1899.)
(No Model.)
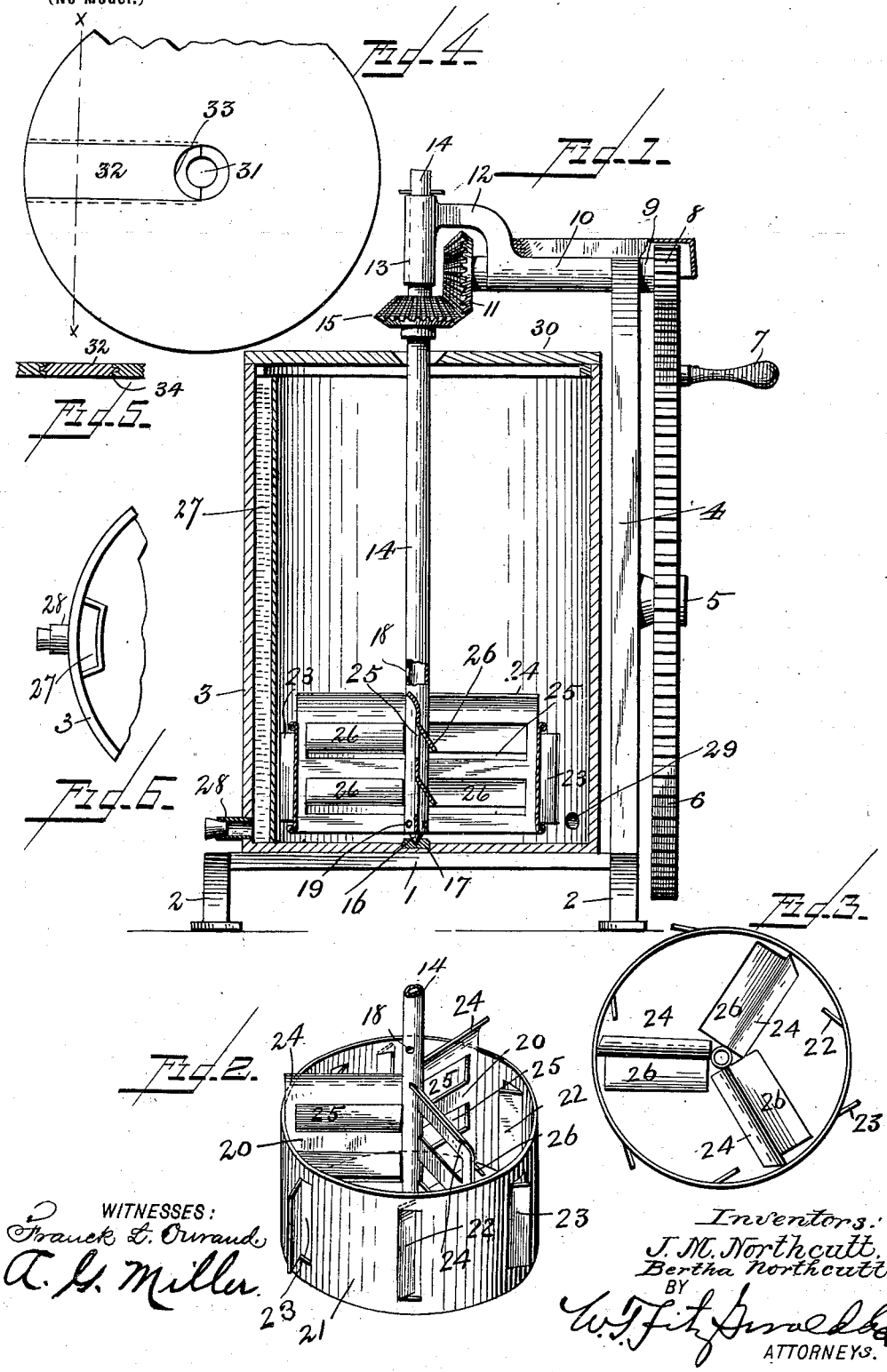
WITNESSES:
Franck L. Ourand
A. G. Miller
Inventors:
J. M. Northcutt,
Bertha Northcutt
BY
W. T. Fitz
ATTORNEYS.

UNITED STATES PATENT OFFICE.

BERTHA NORTHCUTT AND JOSEPH M. NORTHCUTT, OF MARYVILLE, MISSOURI.

CHURN.

SPECIFICATION forming part of Letters Patent No. 657,611, dated September 11, 1900.

Application filed November 15, 1899. Serial No. 737,124. (No model.)

*To all whom it may concern:*

Be it known that we, BERTHA NORTHCUTT and JOSEPH M. NORTHCUTT, citizens of the United States, residing at Maryville, in the county of Nodaway and State of Missouri, have invented certain new and useful Improvements in Churns; and we do hereby declare the following to be a full, clear, and exact description of the invention, such as will enable others skilled in the art to which it appertains to make and use the same.

Our invention relates to churns; and it consists in certain novel features of construction and combination of parts, the preferred construction of which will be illustrated in the accompanying drawings and fully set forth in the following specification.

The object of our invention is to not only provide reliably-efficient means whereby the thorough agitation of the cream will be effected at the expense of a minimum amount of labor, but also insure that the temperature of the cream may be established at the desired point, which, as demonstrated by experience, will insure the earliest disintegration or breaking up of the globules of butter, and thereby insure that the operation of churning or producing butter may be accomplished in the shortest possible time.

While we shall describe in the following specification the preferred construction which may be adopted for the several parts of our invention, it will be understood that we desire to comprehend the substantial equivalent thereof, inasmuch as slight modifications may be made without departing from the spirit of our invention.

With the foregoing objects in view it may be briefly stated that our invention consists in a dasher of novel construction and, further, in devices whereby the temperature of the contents of the body of the churn may be raised or lowered, as desired.

In the accompanying drawings, Figure 1 is a central vertical section of our improved churn, showing the operating mechanism in elevation. Fig. 2 is a perspective detail view of our improved dasher. Fig. 3 is a top plan view of the dasher. Fig. 4 is a top plan view of the lid of our churn. Fig. 5 is a section of a portion of the lid shown in Fig. 4, taken on line $x\,x$. Fig. 6 is a detail showing a top view of the tempering-chamber, which is preferably located at one side of our churn-body.

For convenience of reference to the several 55 parts of our invention and their coöperating accessories numerals will be employed, of which 1 indicates the base portion of our churn, which is provided with suitable legs 2, and upon the base thus provided we locate our churn, which may be constructed in any preferred way, though it is thought that best results will be secured when it is made cylindrical in form.

Upon one end of the base 1 we erect the standard 4, to which we secure in a suitable bearing 5 the driving-wheel 6, provided with the operating-handle 7. The driving-wheel 6 is designed to mesh with the gear 8, which is keyed upon the shaft 9, which passes through suitable bearings provided in the bracket 10 and has secured to its inner end the beveled gear 11. An auxiliary bracket 12 is connected to the bracket 10 and is provided with the tubular extension 13, designed to provide bearings for the upper end of the shaft 14, which, as will be seen by reference to Fig. 1, is provided with the beveled gear 15 designed to mesh with the gear 11 and extends downward into the churn-body, and is provided at its lower end with the conical point 16, adapted to rest in the seat 17, located in the center of the bottom of the churn. The shaft 14 is tubular and is left open at its upper end, while an aperture, as indicated at 18 in Fig. 2, or a series of apertures, as indicated by the numeral 19 in Fig. 1, may be provided in said shaft, whereby the free escape of the air as it passes downward through the shaft is permitted, the purpose of which will be hereinafter specifically set forth.

To the lower end of the shaft 14 we secure a series of radiating members 20, the outer ends of which are sustained or reinforced by being connected to the inner surface of the cylindrical casing 21, which, as will be seen by reference to Figs. 2 and 3, is provided with a series of alternately inwardly and outwardly directed blades, (indicated, respectively, by the numerals 22 and 23,) the purpose of which is to insure the thorough agitation of the cream as the casing 21 is rotated.

The series of radiating blades 20 are each provided at their upper edges with the curved terminals 24 and with a series of slots 25, the slots being formed by so cutting out said slots that the lips 26 will be provided, and since said lips are so disposed that they will occupy a different angle from the plane of the blades of which they form a part it is obvious that the contents of the churn as it passes through the slots 25 will be directed downward or upward, according to the disposition of the lips 26. By thus disposing the blades radially and providing the lips 26, so that they will occupy a different angle, and, furthermore, by providing the curved terminals 24 upon the upper edges of said blades said parts will so coöperate with the cylindrical casing 21 and the blades 22 and 23, carried thereby, that a violent agitation of the contents of the churn will be easily effected by a simple rotation of the shaft 14 through the mechanism coöperating therewith, and since all of said parts may be very quickly and cheaply manufactured and readily assembled in their respective operative positions it will be seen that we have provided a churn which will be found to be very desirable.

In order to provide means whereby the temperature of the contents of the churn may be brought to the desired point, we provide the tempering-chamber 27, preferably upon one side of the interior of the churn-body, as shown in Figs. 1 and 6, the upper end of which is designed to extend nearly to the top of the churn-body and be left open, thereby facilitating the introduction in said chamber of hot water when it is desired to raise the temperature of the cream or permit the introduction of cracked ice or ice-water when it is desired to lower said temperature, a suitable vent or faucet, as indicated by the numeral 28, being provided in the lower end of said tempering-chamber, whereby the contents may be easily drawn off when desired.

It will be understood that a suitable vent or faucet 29 may be provided in the bottom of the churn-body in order that the contents thereof may be easily removed without the necessity of disturbing the position of said body.

A suitable lid 30 is provided for the churn-body, and in order to permit the disposition thereof in its operative position we provide the central aperture 31, designed to receive the shaft 14, and in order to permit the free removal of said lid we provide the sliding section 32, having the semibearing 33 formed upon its inner end, and it is clear that as the edges of the section 32 are provided with suitable ribs 34, designed to fit in grooves provided in the contiguous part of the lid, said section may be readily withdrawn, and thus permit the removal of the lid.

It will be seen that we have provided reliably-efficient means whereby the contents of the churn-body may be thoroughly agitated and brought to the desired temperature, and believing that the advantages and use of our invention have been made fully apparent further reference to the details will be dispensed with.

Having thus fully described our invention, what we claim as new, and desire to secure by Letters Patent, is—

The herein-described churn-dasher consisting of a tubular shaft; radial blades secured to said shaft; a casing surrounding said blades and connected to the free ends thereof and provided with a series of alternately inwardly and outwardly directed blades, said radial blades attached to said shaft further having a curved upper edge and a series of openings and lips partly covering said openings, all combined in the manner specified and for the purpose set forth.

In testimony whereof we affix our signatures in presence of two witnesses.

BERTHA NORTHCUTT.
JOSEPH M. NORTHCUTT.

Witnesses:
 JAMES K. YOUNG,
 FRANK ZENDER.